(12) United States Patent
Pajukoski et al.

(10) Patent No.: US 7,653,140 B2
(45) Date of Patent: Jan. 26, 2010

(54) RADIO ACCESS SCHEME IN CDMA-BASED COMMUNICATION SYSTEM

(75) Inventors: Kari Pajukoski, Oulu (FI); Esa Tiirola, Oulu (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 572 days.

(21) Appl. No.: 11/357,958

(22) Filed: Feb. 22, 2006

(65) Prior Publication Data

US 2006/0233125 A1  Oct. 19, 2006

(30) Foreign Application Priority Data

Apr. 15, 2005  (FI) .................................. 20055175

(51) Int. Cl.
*H04L 27/28* (2006.01)
(52) U.S. Cl. ...................................................... 375/260
(58) Field of Classification Search ................. 375/260, 375/130, 147, 261, 316, 346; 370/342, 335, 370/346, 350
See application file for complete search history.

(56) References Cited

U.S. PATENT DOCUMENTS

| | | | |
|---|---|---|---|
| 5,793,757 A | | 8/1998 | Uddenfeldt |
| 6,101,176 A | * | 8/2000 | Honkasalo et al. .......... 370/335 |
| 2004/0166886 A1 | | 8/2004 | Laroia et al. |
| 2008/0285534 A1 | * | 11/2008 | Dent .......................... 370/342 |

FOREIGN PATENT DOCUMENTS

| | | |
|---|---|---|
| EP | 1 503 534 A1 | 2/2005 |
| WO | WO 01/03347 A1 | 1/2001 |

* cited by examiner

*Primary Examiner*—Khai Tran
(74) *Attorney, Agent, or Firm*—Squire, Sanders & Dempsey L.L.P.

(57) ABSTRACT

A solution for radio access in a code division multiple access (CDMA)-based telecommunication system, in which orthogonal spreading codes are used for separating data of a plurality of user entities, is provided. According to the solution, a different pilot symbol sequence is allocated to each user entity, and the pilot symbol sequences of user entities are selected by allocating different frequencies for pilot symbol sequences of different user entities according to a frequency division multiple access (FDMA) technique in order to mitigate the effect of multiple access interference.

36 Claims, 2 Drawing Sheets

RADIO ACCESS SCHEME IN CDMA-BASED COMMUNICATION SYSTEM

BACKGROUND OF THE INVENTION

1. Field of the Invention

The invention relates to a radio access scheme which considerably reduces the effect of multiple access interference in a code division multiple access (CDMA)-based communication system.

2. Description of the Related Art

A conventional code division multiple access (CDMA)-based communication system, for example a universal mobile communication system (UMTS), is interference-limited due to non-orthogonality of the spreading codes used for separating different users (or channels) of the same frequency band. In the uplink, users are further separated from each other by allocating a separate long scrambling code to each user. The codes are not orthogonal at a receiver due to the properties of the codes. In the downlink, users are separated by orthogonal Walsh/Hadamard spreading codes which remain orthogonal in a frequency-nonselective radio channel. On the other hand, in a frequency-selective radio channel the orthogonality is lost. The interference-limited nature of CDMA-based communication systems results in degraded receiver performance as the number of users in a cell increases. The degradation in receiver performance is caused by multiple access interference (MAI). MAI is present in both data signals and pilot signals. MAI in pilot signals results in decreased accuracy in channel estimation and synchronisation, for example.

MAI is caused by the non-orthogonality of the spreading codes in the receiver. Increased correlation between the spreading codes may be caused by a delay spread of a radio channel along with the properties of the spreading codes. Sub-optimal multi-user receivers have been developed to reduce the effect of MAI. Multi-user receivers may be classified into two main categories: linear equalizers and subtractive interference cancellation (IC) receivers. Linear equalizers, such as decorrelating detectors (i.e. zero-forcing equalizers) and minimum mean square error (MMSE) detectors, attempt to remove correlation between the spreading codes. The principle of an IC receiver is that a multiple access interference component is estimated and then subtracted from the received signal for making decisions more reliable.

Linear equalizers are not very suitable particularly in the up-link, when the number of simultaneously accessing users is high. IC receivers are usually complex, because the interference component is estimated by estimating the contribution of interference of each user and summing the contributions. Additionally, interference cancellation algorithms perform non-ideally mainly because of unreliable tentative bit decisions in estimation of interference contributed by a given a user, and because of errors in the channel estimation. Errors in channel estimation are caused by MAI appearing in pilot symbols, for example.

SUMMARY OF THE INVENTION

An object of the invention is to provide an improved solution for radio access in a code division multiple access (CDMA)-based telecommunication system in which orthogonal spreading codes are used for separating data of a plurality of user entities.

According to an aspect of the invention, there is provided a method for radio access in a code division multiple access (CDMA)-based telecommunication system in which orthogonal spreading codes are used for separating data of a plurality of user entities, the method comprising allocating each user entity a different pilot symbol sequence and selecting the pilot symbol sequences of user entities by allocating different frequencies to pilot symbol sequences of different user entities, the allocation being similar to a frequency division multiple access (FDMA) technique, in order to mitigate multiple access interference.

According to another aspect of the invention, there is provided a radio network element in a code division multiple access (CDMA)-based telecommunication system in which orthogonal spreading codes are used for separating data of a plurality of user entities, the radio network element comprising a communication interface to provide a communication connection with a plurality of user entities, and a control unit. The control unit is configured to allocate each user entity a different pilot symbol sequence and select the pilot symbol sequences of user entities by allocating different frequencies to pilot symbol sequences of different user entities, the allocation being similar to a frequency division multiple access (FDMA) technique, in order to mitigate multiple access interference.

According to another aspect of the invention, there is provided a transceiver unit in a code division multiple access (CDMA)-based telecommunication system in which orthogonal spreading codes are used for separating data of a plurality of user entities. The transceiver unit comprises a communication interface to provide a connection with a radio network element and a control unit connected to the communication interface. The control unit is configured to receive from the radio network element, a pilot symbol sequence to be used in communication with another transceiver unit. The pilot symbol sequence is selected by allocating to the pilot symbol sequence different frequencies than to pilot symbol sequences of other user entities, the allocation being similar to a frequency division multiple access (FDMA) technique, in order to mitigate multiple access interference. The control unit is further configured to transmit data and the pilot symbol sequence in frames such that each frame comprises at least one time interval for transmission of the pilot symbol sequence and a plurality of time intervals for transmission of data, spread a data symbol with an orthogonal spreading code, thereby obtaining a plurality of chip symbols for the data symbol, map the chip symbols into a plurality of time intervals for transmission in order to improve cross-correlation properties of the spreading code, and transmit the chip symbols in the plurality of time intervals.

According to another aspect of the invention, there is provided a code division multiple access (CDMA)-based telecommunication system in which orthogonal spreading codes are used for separating data of a plurality of user entities, the telecommunication system comprising a network element comprising a communication interface to provide a connection with one or more transceiver units of the telecommunication system and a control unit connected to the communication interface, the control unit being configured to allocate each transceiver unit a different pilot symbol sequence, and one or more transceiver units, each transceiver unit comprising a communication interface to provide a connection with the network element, and a control unit connected to the communication interface, the control unit being configured to receive from the radio network element a pilot symbol sequence to be used in communication with another transceiver unit. The control unit of the network element is further configured to select the pilot symbol sequences of the transceiver unit by allocating different frequencies to pilot symbol sequences of different user entities, the allocation being similar to a frequency division multiple access (FDMA) technique, in order to mitigate multiple access interference, and the control unit of each transceiver unit is further configured to transmit data and the pilot symbol sequence in frames such that each frame comprises at least one time interval for transmission of the pilot symbol sequence and a plurality of time intervals for transmission of data, spread a data symbol with an orthogonal spreading code, thereby obtaining a plurality of chip symbols for the data symbol, map the chip symbols into a plurality of time intervals for transmission in order to improve cross-correlation properties of the spreading code, and transmit the chip symbols in the plurality of time intervals.

According to another aspect of the invention, there is provided a radio network element in a code division multiple access (CDMA)-based telecommunication system in which orthogonal spreading codes are used for separating data of a plurality of user entities. The radio network element comprising communication means for providing a communication connection with a plurality of user entities, means for allocating each user entity a different pilot symbol sequence, and means for selecting the pilot symbol sequences of user entities by allocating different frequencies to pilot symbol sequences of different user entities, the allocation being similar to a frequency division multiple access (FDMA) technique, in order to mitigate multiple access interference.

According to another aspect of the invention, there is provided a computer program product encoding a computer program of instructions for executing a computer process for radio access in a code division multiple access (CDMA)-based telecommunication system in which orthogonal spreading codes are used for separating data of a plurality of user entities. The process comprises allocating each user entity a different pilot symbol sequence and selecting the pilot symbol sequences of user entities by allocating different frequencies to pilot symbol sequences of different user entities, the allocation being similar to a frequency division multiple access (FDMA) technique, in order to mitigate multiple access interference.

According to another aspect of the invention, there is provided a computer program distribution medium readable by a computer and encoding a computer program of instructions for executing a computer process for radio access in a code division multiple access (CDMA)-based telecommunication system in which orthogonal spreading codes are used for separating data of a plurality of user entities. The process comprises allocating each user entity a different pilot symbol sequence and selecting the pilot symbol sequences of user entities by allocating different frequencies to pilot symbol sequences of different user entities, the allocation being similar to a frequency division multiple access (FDMA) technique, in order to mitigate multiple access interference.

The invention provides several advantages. Since pilot symbol sequences of different users have different frequency components, the pilot symbols received in the receiver are free of multiple access interference, which improves the performance of the procedures the pilot symbols are used for, particularly channel estimation and multipath equalization. Additionally, data symbols of each user entity are also free of multiple access interference in a telecommunication system in which user entities are mutually synchronized. This results from the fact that the effect of the frequency selective radio channel on the non-orthogonality between the spreading codes may be compensated through improved accuracy in the MAI-free channel estimation, but also from the fact that non-orthogonality caused by mutual delay differences of different spreading codes is removed by synchronisation of user entities and mapping of user data according to an embodiment of the invention described in the dependent claims and in the description of embodiments below.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Figure 1:
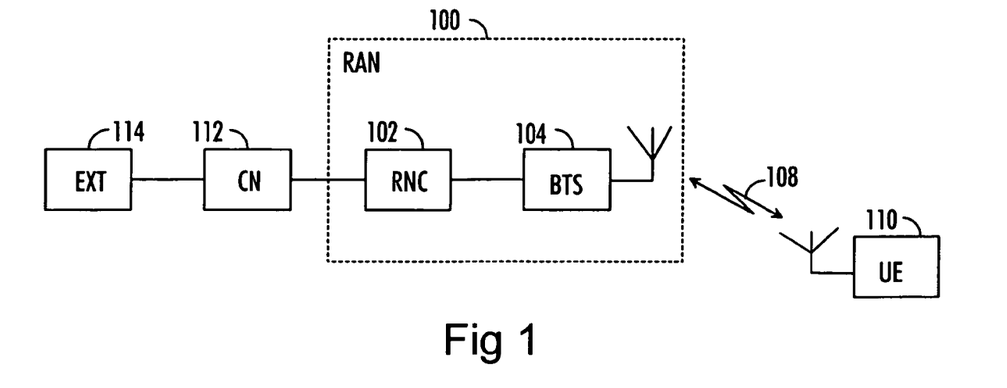
FIG. 1 illustrates a structure of a communication system in which embodiments of the invention may be implemented.

With reference to FIG. 1, examine an example of a data transmission system in which embodiments of the invention may be applied. The structure and the elements of the system illustrated in FIG. 1 are the same as in the Universal Mobile Telecommunication System (UMTS) network, but it should, however, be noted that the implementation of the proposed radio access scheme is not limited to the UMTS system but may also be implemented in another code division multiple access (CDMA) based telecommunication system in which orthogonal spreading codes are used for separating data of a plurality of user entities.

The network elements of the communication system of FIG. 1 can be grouped into a radio access network (RAN) 100 that handles all radio-related functionalities of the system and a core network (CN) 112, which takes care of switching and routing of calls and data connections to external networks 114. An external network may be for example the Internet, Integrated Services Digital Network (ISDN), or Public Switched Telephone Network (PSTN).

The radio access network 100 comprises one or several base transceiver stations (BTS) 104 and radio network controllers (RNC) 102. A BTS 104 is responsible for providing an air interface radio connection 108 to the user entities 110 within its coverage area, also known as a cell. The BTS 104 also performs physical level signal processing, such as modulation, channel coding, etc. The BTS 104 may also perform some basic radio resource management operations, such as operations related to power control.

A radio network controller 102 is the network element responsible for the control of radio resources in the RAN 100. The RNC 102 serves as a switching and controlling element of the RAN 100 and typically controls several BTSs 104, but it may also control only a single BTS 104. RNC 102 is responsible for allocating pilot symbol sequences to user entities and base transceiver stations within its own cells. The RNC 102 also takes care of procedures related to admission control, handovers, and power control. The radio network controller 102 typically includes a digital signal processor and software for executing computer processes stored on a computer readable medium. Furthermore, the radio network controller 102 typically includes connecting means for communicating with other network elements, such as other radio network controllers and/or base transceiver stations, but also with the core network 112.

The core network 112 provides a combination of switching and transmission equipment, which together form a basis for telecommunication network services. The core network also performs procedures related to radio resource management. The core network 112 may provide circuit-switched and/or packet-switched data transport services to the user entities.

Figure 2:
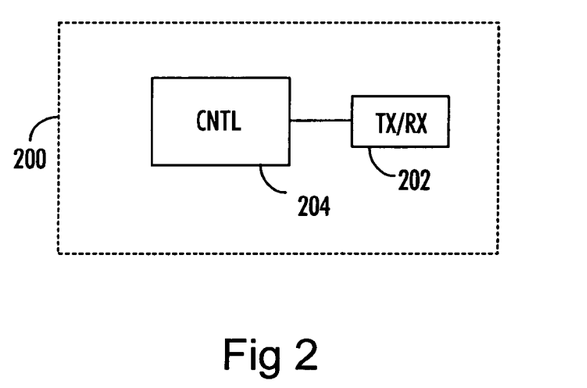
FIG. 2 illustrates a structure of a network element in which embodiments of the invention may be implemented.

Next, the structure of a radio network element 200 will be described with reference to FIG. 2. The radio network element 200 may be a radio network controller controlling one or several base transceiver stations in a communication system.

The radio network element 200 comprises a communication interface 202 for transmitting and receiving information signals to/from base transceiver stations and user entities. The radio network element 200 further comprises a control unit 204 to control the functions of the radio network element 200. The control unit 204 may comprise means for selecting and allocating pilot symbol sequences to be used in communication between a base transceiver station and user entities served by the base transceiver station. The control unit 204 may be implemented with a digital signal processor provided with suitable software embedded on a computer readable medium, or with separate logic circuits, for example with ASIC (Application Specific Integrated Circuit).

Figure 3:
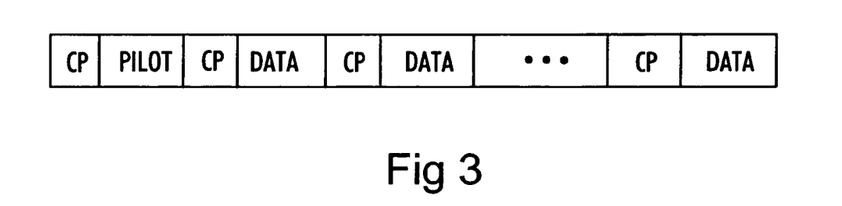
FIG. 3 illustrates an example of a frame structure of a telecommunication system according to an embodiment of the invention.

Next, a frame structure employable in a CDMA-based communication system according to an embodiment of the invention will be described with reference to FIG. 3. The frame structure in FIG. 3 comprises a time interval for transmission of pilot symbol sequences and a plurality of time intervals for transmission of data. If determined, a plurality of time intervals may also be assigned for transmission of pilot symbol sequences. Each time interval is preceded by a cyclic prefix in order to simplify frequency domain equalization which is employed in the communication system in order to provide the communication system with a low complexity yet effective equalization mechanism.

A pilot symbol sequence to be used in communication between a base transceiver station and a user entity may be allocated by a radio network element, for example a radio network controller. A different pilot symbol sequence may be allocated to each user entity. The radio network element may select a pilot symbol sequence from a set of pilot symbol sequences such that the selected pilot symbol sequence meets the required properties. The pilot symbol sequence is selected by utilizing a frequency division multiple access (FDMA) technique such that the pilot symbol sequences of different user entities are transmitted on different frequencies. Since the pilot symbol sequences are transmitted on different frequencies, the pilot symbol sequences remain orthogonal and free of multiple access interference (MAI). Alternatively, FDMA may be utilized to select of the pilot symbol sequence such that the pilot symbol sequence occupies partly the same frequencies as a pilot symbol sequence selected for another user entity. This embodiment reduces multiple access interference, but the pilot symbol sequence is not free from MAI at a receiver.

One purpose of a pilot symbol sequence is to indicate frequency selective fading of an information signal in a radio channel. The pilot symbol sequence should indicate frequency selective fading in a frequency band occupied by the information signal. In order to utilize FDMA with respect to different pilot symbol sequences and to indicate frequency selective fading on the frequency band shared by information signals of a plurality of user entities separated by orthogonal spreading codes, a pilot symbol sequence may be selected such that the pilot symbol sequence has a comb-shaped frequency spectrum. When a signal has comb-shaped frequency spectrum, it is understood that the signal energy is concentrated to a plurality of frequency peaks (or frequency components) in which a bandwidth of a frequency peak is narrow if compared to the total bandwidth of the signal.

Figure 4:
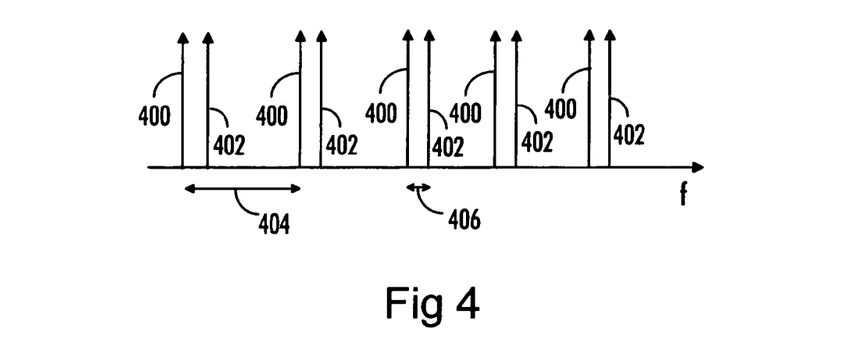
FIG. 4 illustrates an example of a frequency spectrum of pilot symbol sequences according to an embodiment of the invention.

In order to utilize FDMA with respect to different pilot symbol sequences, the pilot symbol sequence may be selected such that the pilot symbol sequence has energy on frequencies not occupied by another pilot symbol sequence. FIG. 4 illustrates frequency spectrums of two pilot symbol sequences. The frequency spectrum of the first pilot symbol sequence is indicated by numeral 400 and the frequency spectrum of the second pilot symbol sequence is indicated by numeral 402. Assume that the first pilot symbol sequence was selected first. Thus, there were no other pilot symbol sequences operating on the same frequency band and therefore any pilot symbol sequence from a set of pilot symbol sequences may have been selected. The second pilot symbol sequence was selected by taking into account that the pilot symbol sequence should not operate on the same frequencies than the first pilot symbol sequence. Therefore, a pilot symbol sequence having suitable properties was selected from the set of pilot symbol sequences. Thus, the first and the second pilot symbol sequence remain orthogonal and do not interfere with each other.

In order to indicate frequency selective fading on the frequency band occupied by the information signal, a frequency interval between the lowest and the highest frequency component of a pilot symbol sequence should be substantially the same as the bandwidth of the information signal. Additionally, a frequency interval between two adjacent frequency components of a pilot symbol sequence should be lower than a coherence bandwidth of the radio channel. This frequency interval is indicated by numeral 404 in FIG. 4. The coherence bandwidth of the radio channel may be determined by measuring the delay spread of the radio channel, for example. By selecting a pilot symbol sequence such that the frequency interval between two adjacent frequency components of the pilot symbol sequence is lower than the determined coherence bandwidth of the radio channel, the possibility of not detecting a strongly fading frequency is minimized.

In order to minimize a possibility that two (or more) pilot symbol sequences would interfere with each other because of frequency offsets of the frequency components of the pilot symbol sequences caused by, for example, the Doppler spread, a pilot symbol sequence may be selected such that a frequency interval between the frequency components of the pilot symbol sequence and the frequency components of other pilot symbol sequences are higher than a maximum frequency offset determined for a frequency component. This frequency interval is indicated by numeral 406 in FIG. 4. The maximum frequency offset of a frequency component may be determined through measurements or by assuming the maximum possible relative speed between a user entity and a serving base transceiver station.

Additionally, a pilot symbol sequence may be selected to have a substantially flat frequency spectrum. In practice, this means that a substantially equal amount of energy exists on each frequency component in the frequency spectrum of the pilot symbol sequence. This simplifies the detection of frequency selective fading in a receiver, since relative fading of different frequency components may be detected without compensating for the energy difference of different frequency components. Alternatively, a pilot symbol sequence may be selected to have a non-flat frequency spectrum. In this case, the receiver should have knowledge of the frequency spectrum of the pilot symbol sequence in order to compensate for the energy difference of different frequency components and to detect frequency selective fading correctly. Additionally, the pilot symbol sequence may be selected such that the pilot symbol sequence has a substantially constant envelope. Thus, requirements regarding power amplifiers of a transmitter may be reduced, since the power amplifiers may operate at or near saturation levels and full linearity is not required of the power amplifiers. A constant envelope pilot symbol sequence also provides better spectral efficiency than a non-constant envelope pilot symbol sequence.

According to an embodiment of the invention, one time interval in a frame is allocated for transmission of pilot symbol sequences. For this time interval, a pilot symbol sequence is selected to have a frequency spectrum which remains substantially the same for the duration of the pilot symbol sequence. According to another embodiment of the invention, two time intervals in a frame are allocated for transmission of pilot symbol sequences for allowing more users to access the radio channel. According to this embodiment, a pilot symbol sequence of a user entity may be selected to have a frequency spectrum evolving during transmission. The pilot symbol sequence may be transmitted during both time intervals allocated for transmission of pilot symbol sequences; the frequency components of the lower half of the frequency spectrum may be transmitted during the first time interval and the frequency components of the higher half of the frequency spectrum during the second time interval, for example. Then, another pilot symbol sequence(s) may be transmitted by using the frequency components of the higher half of the frequency spectrum during the first time interval and the frequency components of the lower half of the frequency spectrum during the second time interval. Thus number of pilot symbol sequences (i.e. the number of user entities) may be doubled without a decrease in the frequency resolution of the pilot symbol sequences. Alternatively, more than two time intervals may be allocated for transmission of pilot symbol sequences, and pilot symbol sequences may be selected such that more than two pilot symbol sequences are transmitted using same frequency components during transmission. In a preferred embodiment of the invention, however, pilot symbol sequences are selected such that two pilot symbol sequences do not occupy the same frequency component at the same time.

As mentioned above, data is transmitted in a frame during time intervals allocated for transmission of data. In order to further reduce frequency selective fading of data, the data may be transmitted according to the following procedure. The procedure will be described with reference to FIG. 5.

Figure 5:
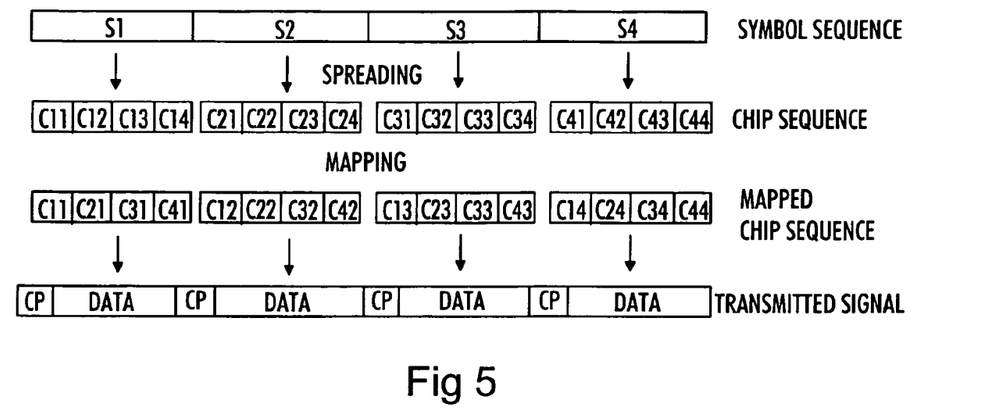
FIG. 5 illustrates processing of a symbol sequence to be transmitted according to an embodiment of the invention.

FIG. 5 comprises a data symbol sequence of a user entity, the data symbol sequence comprising four data symbols S1, S2, S3 and S4. Each symbol is spread by applying an orthogonal spreading code. After the spreading operation, a chip symbol sequence comprising four chip symbols for each data symbol is obtained. Chip symbols C11, C12, C13, and C14 correspond to the data symbol S1, chip symbols C21, C22, C23, and C24 correspond to the data symbol S2, chip symbols C31, C32, C33, and C34 correspond to the data symbol S3, and chip symbols C41, C42, C43, and C44 correspond to the data symbol S4. After the spreading operation, a mapping operation is carried out to the chip symbols. Through the mapping operation, the first chip symbol of each chip symbol sequence corresponding to a data symbol is mapped into a first group, the second chip symbol of each chip symbol sequence corresponding to a data symbol is mapped into a second group, and so on. The result is a mapped chip symbol sequence comprising four groups of chip symbols.

Next, each group of chip symbols is allocated to a different time interval of a frame. Each time interval is preceded by a cyclic prefix. Then, after standard transmission operations, such as conversion to a radio frequency, amplifying, and filtering, the data may be transmitted to a receiver. The receiver performs reverse operations by detecting the data in the time intervals, removing the mapping, despreading, and so on. The procedure described above is merely an example of the transmission procedure and does not limit the transmission parameters in any way.

By transmitting chip symbols corresponding to a data symbol in a plurality of time intervals, protection against MAI is achieved if the channel remains constant over the spreading period.

Figure 6:
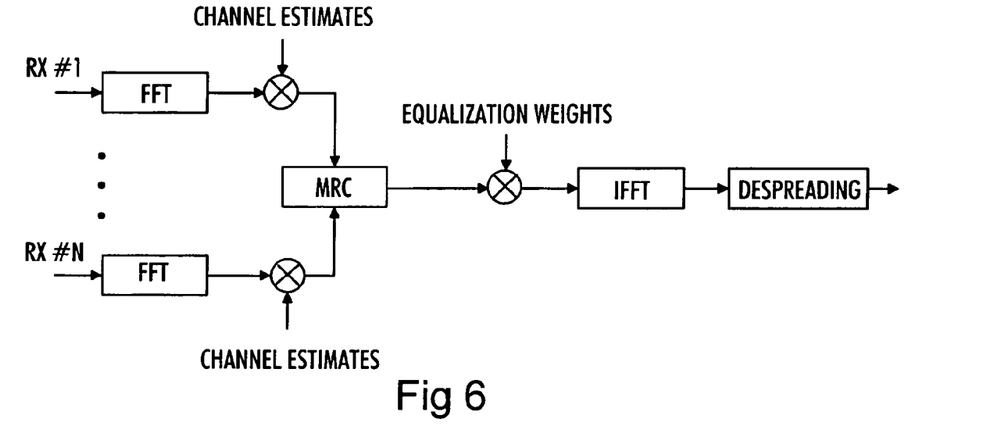
FIG. 6 illustrates an example of a receiver structure according to an embodiment of the invention.

Next, a procedure for compensating distortions of transmitted data occurred in a radio channel will be described with reference to FIG. 6. A transmitted signal propagated through a radio channel may be received through one or more antennas. In FIG. 6, a first received signal is received through a first receiver antenna. Procedures, such as filtering, downmixing, and analog-to-digital (A/D) conversion, which are not illustrated, may be carried out to the received signal. The effects of the radio channel on the transmitted signal may be compensated for in a frequency domain in order to implement a computationally simple yet effective compensation. Additionally, a pilot symbol sequence has properties which cause the pilot symbol sequence to describe the properties of the radio channel better in the frequency domain and therefore processing of the received signal in the frequency domain is justified.

First, the received signal is converted into a frequency domain by applying a fast Fourier transform (FFT) algorithm to the received signal. Channel estimates of the radio channel are obtained from a pilot symbol sequence received through the first antenna. The channel estimates are also transformed into the frequency domain by applying the FFT algorithm. Phase distortion of the transmitted signal may be compensated for by multiplying the received signal by the channel estimates in the frequency domain. The operations described above may be carried out to the signals received through each antenna of the receiver separately. After the phase distortion of each received signal has been compensated for, the received signals from each reception antenna may be combined coherently. The signals may be combined according to a maximal ratio combining (MRC) procedure. Next, effects of frequency selective fading on the transmitted signal are compensated for. The combined received signal is multiplied by equalization weights obtained from a pilot symbol sequence by utilizing, for example, a minimum mean square error (MMSE) algorithm for estimating the frequency selectivity of the radio channel. Again, the equalization weights are transformed into the frequency domain. Next, the equalized signal is transformed back to the time domain by applying an inverse fast Fourier transform (IFFT) operation to the equalized signal. After IFFT, the time-domain equalized signal is despread and detected.

The receiver structure described above is a modular structure and thus operations may be carried out in a different order. For example, equalization may be carried out before antenna combining.

Data transmission according to the procedure described above may be carried out in a transceiver unit of a telecommunication system in which embodiments of the invention are implemented. The transceiver unit may be a user entity or a base transceiver station. The transceiver unit may comprise a communication interface for transmitting and receiving information signals between a base transceiver station and a user entity. The transceiver unit may further comprise a control unit to control functions of the transceiver unit. The control unit may be implemented as a digital signal processor provided with suitable software embedded on a computer readable medium, or with separate logic circuits, for example with ASIC (Application Specific Integrated Circuit).

The embodiments of the invention may be implemented as a computer program comprising instructions for executing a computer process for radio access in a code division multiple access (CDMA)-based telecommunication system in which orthogonal spreading codes are used for separating data of a plurality of user entities. The computer program may be distributed such that operations related to selecting and allocating pilot symbol sequences are carried out in a radio network element, for example in a radio network controller, and operations related to transmission of pilot symbol sequences and data sequences are carried out in a transceiver unit of the telecommunication system, for example in a base transceiver station or a user entity.

The computer program may be stored on a computer program distribution medium readable by a computer or a processor. The computer program medium may be, for example but not limited to, an electric, magnetic, optical, infrared or semiconductor system, device or transmission medium. The medium may be a computer readable medium, a program storage medium, a record medium, a computer readable memory, a random access memory, an erasable programmable read-only memory, a computer readable software distribution package, a computer readable signal, a computer readable telecommunications signal, and a computer readable compressed software package.

Even though the invention has been described above with reference to an example according to the accompanying drawings, it is clear that the invention is not restricted thereto but it can be modified in several ways within the scope of the appended claims.

What is claimed:

1. A method comprising:
   allocating to each user entity a different pilot symbol sequence;
   selecting a pilot symbol sequence of a user entity by allocating a different frequency to each pilot symbol sequence of each user entity, the allocation being a frequency division multiple access technique; and
   receiving one or more frames with each frame comprising at least one time interval for transmission of the pilot symbol sequences of the user entities and a plurality of time intervals for transmission of data of the user entities.

2. The method of claim 1, further comprising:
   selecting a pilot symbol sequence of a user entity having a comb-shaped frequency spectrum having energy on a plurality of frequency peaks and having at least one frequency peak on a different frequency than the frequency peaks of other pilot symbol sequences selected for other user entities.

3. The method of claim 2, further comprising:
   selecting a pilot symbol sequence of a user entity having all of the frequency peaks on different frequencies than the frequency peaks of another pilot symbol sequence selected for another user entity.

4. The method of claim 2, further comprising:
   selecting a pilot symbol sequence that has a substantially constant envelope.

5. The method of claim 2, further comprising:
   selecting a pilot symbol sequence that has a substantially flat frequency spectrum.

6. The method of claim 2, further comprising:
   selecting the pilot symbol sequence with the frequency spectrum remaining substantially the same during transmission of the pilot symbol sequence.

7. The method of claim 2, further comprising:
   selecting the pilot symbol sequence with the frequency spectrum evolving during a transmission of the pilot symbol sequence such that another pilot symbol sequence may be selected to use, at least partly, the same frequencies as the pilot symbol sequence.

8. The method of claim 2, further comprising:
   selecting the pilot symbol sequence having the comb-shaped frequency spectrum with determined frequency intervals between frequency components of the frequency spectrum.

9. The method of claim 7, further comprising:
   selecting a pilot symbol sequence with a determined frequency interval between adjacent frequency components being lower than a determined coherence bandwidth of the radio channel.

10. The method of claim 2, further comprising:
    selecting a pilot symbol sequence such that frequency components of different pilot symbol sequences are separated by a frequency interval which is higher than a maximum frequency offset determined for a frequency component.

11. The method of claim 1, wherein the pilot symbol sequences and the data are time-multiplexed in the frame.

12. An apparatus, comprising:
    a communication interface configured to provide a communication connection with a plurality of user entities; and
    a controller configured to
    allocate to each user entity a different pilot symbol sequence
    select each pilot symbol sequence of each user entity by allocating a different frequency to each pilot symbol sequence of each user entity, the allocation being a frequency division multiple access technique;
    apply a frame structure where each frame comprises at least one time interval for transmission of the pilot symbol sequence and a plurality of time intervals for the transmission of the data.

13. The apparatus of claim 12, wherein the controller is further configured to select a pilot symbol sequence of a user entity having a comb-shaped frequency spectrum having energy on a plurality of frequency peaks and having at least one frequency peak on a different frequency than the frequency peaks of other pilot symbol sequences selected for other user entities.

14. The apparatus of claim 13, wherein the controller is further configured to select a pilot symbol sequence of a user entity having all of the frequency peaks on different frequencies than the frequency peaks of another pilot symbol sequence selected for another user entity.

15. The apparatus of claim 13, wherein the controller is further configured to select a pilot symbol sequence having a substantially constant envelope.

16. The apparatus of claim 13, wherein the controller is further configured to select a pilot symbol sequence having a substantially flat frequency spectrum.

17. The apparatus of claim 13, wherein the controller is further configured to select the pilot symbol sequence with the frequency spectrum remaining substantially the same during the transmission of the pilot symbol sequence.

18. The apparatus of claim 13, wherein the controller is further configured to select the pilot symbol sequence with the frequency spectrum evolving during the transmission of the pilot symbol sequence such that another pilot symbol sequence may be selected to use, at least partly, the same frequencies as the pilot symbol sequence.

19. The apparatus of claim 13, wherein the controller is further configured to select a pilot symbol sequence having the comb-shaped frequency spectrum with determined frequency intervals between frequency components of the frequency spectrum.

20. The apparatus of claim 19, wherein the controller is further configured to select a pilot symbol sequence with the determined frequency interval between adjacent frequency components being lower than a determined coherence bandwidth of the radio channel.

21. The apparatus of claim 13, wherein the controller is further configured to select a pilot symbol sequence such that the frequency components of different pilot symbol sequences are separated by a frequency interval which is higher than a maximum frequency offset determined for a frequency component.

22. The apparatus of claim 12, wherein the frame structure includes a data symbol spread with an orthogonal spreading code to obtain a plurality of chip symbols for the data symbol, the chip symbols are mapped into a plurality of time intervals for transmission, and the chip symbols are transmitted in the plurality of time intervals.

23. The apparatus of claim 12, wherein the frame comprises the pilot symbol sequences and the data as time-multiplexed in the frame.

24. The apparatus of claim 12, wherein a cyclic prefix precedes each time interval.

25. An apparatus, comprising:
a communication interface configured to provide a connection to a radio network element;
a controller configured to be connected to the communication interface and further configured to:
receive from the radio network element a pilot symbol sequence allocation to be used in communication with another transceiver unit, the pilot symbol sequence being selected by allocating to the pilot symbol sequence a different frequency from other pilot symbol sequences of other user entities, the allocation being a frequency division multiple access technique, and
transmit data and the pilot symbol sequence in frames such that each frame comprises at least one time interval for transmission of the pilot symbol sequence and a plurality of time intervals for transmission of data.

26. The apparatus of claim 25, wherein the apparatus is applicable to a transceiver unit and wherein the controller is further configured to control the transceiver unit to transmit data sequences by using a single carrier direct spreading code division multiple access technology.

27. The apparatus of claim 25, wherein the controller is further configured to:
spread a data symbol with an orthogonal spreading code to obtain a plurality of chip symbols for the data symbol,
map the chip symbols into a plurality of time intervals for transmission to, and
transmit the chip symbols in the plurality of time intervals.

28. The apparatus of claim 25, wherein the frame comprises the pilot symbol sequences and the data as time-multiplexed in the frame.

29. A system, comprising:
a network element comprising a communication interface and a controller configured to be connected to the communication interface; and
one or more transceivers, each transceiver comprising a communication interface to provide a connection between each transceiver and the network element,
wherein the controller of the network element is configured to
allocate to each transceiver unit a different pilot symbol sequence, and
select for each transceiver unit the different pilot symbol sequence by allocating a different frequency to each pilot symbol sequence of each different user entity, the allocation being a frequency division multiple access technique,
wherein each transceiver comprises a controller configured to:
receive from the radio network element a pilot symbol sequence to be used in communication with another transceiver unit, and
transmit one or more frames such that each frame comprises at least one time interval for transmission of the pilot symbol sequence and a plurality of time intervals for the transmission of the data.

30. An apparatus, comprising:
communication means for providing a communication connection with the plurality of user entities;
means for allocating to each user entity a different pilot symbol sequence;
means for selecting the pilot symbol sequence of a user entity by allocating a different frequency to each pilot symbol sequences of different user entities, the allocation being a frequency division multiple access technique; and
means for receiving one or more frames, each frame comprising at least one time interval for transmission of the pilot symbol sequences of the user entities and a plurality of time intervals for transmission of the data of the user entities.

31. A computer-readable medium encoded with a computer program, the computer program is configured to control a processor to perform, comprising:
allocating to each user entity a different pilot symbol sequence;
selecting the pilot symbol sequence of a user entity by allocating a different frequency to each pilot symbol sequences of different user entities, the allocation being a frequency division multiple access technique; and
applying a frame structure where each frame comprises at least one time interval for transmission of the pilot symbol sequence and a plurality of time intervals for the transmission of the data.

32. The computer-readable medium of claim 31, wherein the computer-readable medium includes at least one of the following mediums: a program storage medium, a record medium, a computer readable memory, a computer readable software distribution package, a computer readable signal, a computer readable telecommunications signal, and a computer readable compressed software package.

33. A method, comprising:
receiving, from a radio network element in a user entity transceiver unit, a pilot symbol sequence allocation to be used in communication with another transceiver unit, the pilot symbol sequence being selected by allocating to the pilot symbol sequence a different frequency from other pilot symbol sequences of other user entities, the allocation being a frequency division multiple access technique, and transmitting one or more frames such that each frame comprises at least one time interval for transmission of the pilot symbol sequence and a plurality of time intervals for transmission of data.

34. The method of claim 33, further comprising:

spreading a data symbol with an orthogonal spreading code to obtain a plurality of chip symbols for the data symbol;

mapping the chip symbols into a plurality of time intervals for transmission; and transmitting the chip symbols in the plurality of time intervals.

35. The method of claim 33, further comprising:

transmitting data sequences by using a single carrier direct spreading code division multiple access technology.

36. The method of claim 33, further comprising: time-multiplexing the transmission of pilot symbol sequences and the data in the frame.

* * * * *

UNITED STATES PATENT AND TRADEMARK OFFICE
CERTIFICATE OF CORRECTION

| | |
|---|---|
| PATENT NO. | : 7,653,140 B2 |
| APPLICATION NO. | : 11/357958 |
| DATED | : January 26, 2010 |
| INVENTOR(S) | : Kari Pajukoski et al. |

Page 1 of 1

It is certified that error appears in the above-identified patent and that said Letters Patent is hereby corrected as shown below:

Column 11

Claim 25, line 8, change "another" to --a--

Signed and Sealed this

Twelfth Day of October, 2010

David J. Kappos
*Director of the United States Patent and Trademark Office*